US011243457B2

(12) United States Patent
Wei et al.

(10) Patent No.: US 11,243,457 B2
(45) Date of Patent: Feb. 8, 2022

(54) MULTI-VOLTAGE OUTPUT CAMERA KIT HANDLE

(71) Applicant: SHENZHEN SONGWEI TECHNOLOGY CO., LTD., Shenzhen (CN)

(72) Inventors: Hongsheng Wei, Nanjing (CN); Kai Chen, Shenzhen (CN)

( * ) Notice: Subject to any disclaimer, the term of this patent is extended or adjusted under 35 U.S.C. 154(b) by 226 days.

(21) Appl. No.: 16/572,643

(22) Filed: Sep. 17, 2019

(65) Prior Publication Data

US 2021/0026228 A1    Jan. 28, 2021

(30) Foreign Application Priority Data

Jul. 22, 2019    (CN) .......................... 201921150125.7

(51) Int. Cl.
*G03B 17/56* (2021.01)
*H01M 10/052* (2010.01)
(Continued)

(52) U.S. Cl.
CPC .......... *G03B 17/56* (2013.01); *H01M 10/052* (2013.01); *H01M 10/46* (2013.01);
(Continued)

(58) Field of Classification Search
CPC ............. G03B 17/56; G03B 2217/007; H01M 50/213; H01M 10/052; H01M 10/46;
(Continued)

(56) References Cited

U.S. PATENT DOCUMENTS 10,236,819 B2    3/2019    White et al.
2011/0152612 A1*    6/2011    Trusty ................... A61B 1/0052
                                                                     600/109
(Continued)

FOREIGN PATENT DOCUMENTS

CN    203225559 U    10/2013
CN    208820504 U    5/2019

OTHER PUBLICATIONS

Soonwell 70Wh Rechargeable Battery Pack Handle with D-TAP, DC and USB Output Quick Release Handle Top Handle Side Handle for BMPCC 4K 6K / Canon 5D/6D/6D2 DSLR Cameral-PH70, Aug. 19, 2019; pp. 1-8.*

*Primary Examiner* — Vuthe Siek (57) ABSTRACT

The utility model discloses a multi-voltage output camera kit handle which comprises a shell, a lithium battery, an intelligent control circuit, a power interface and a power switch. The lithium battery, the intelligent control circuit, the power interface and the power switch are installed on the shell; the shell comprises a lithium battery accommodating cavity and a power interface window; the lithium battery is installed in the lithium battery accommodating cavity; and the power interface is installed at the power interface window; the power interface comprises a charging interface and a discharging interface; the charging interface is used for charging the lithium battery, and the discharging interface is used for discharging different devices; the power switch is used for starting or closing the discharging for different devices; and the power interface, the lithium battery and the power switch are welded on the intelligent control circuit. The utility model can replace an original handle on a kit, occupies no extra space, meets multi-voltage outputs and can supply power for a photographing and video recording unit and the surrounding accessories.

10 Claims, 8 Drawing Sheets

(51) Int. Cl.
*H01M 10/46* (2006.01)
*H01M 50/213* (2021.01)
*H02J 7/00* (2006.01)
(52) U.S. Cl.
CPC ......... *H01M 50/213* (2021.01); *H02J 7/0029* (2013.01); *H02J 7/0045* (2013.01); *H02J 7/0047* (2013.01); *H02J 7/0068* (2013.01); *G03B 2217/007* (2013.01); *H01M 2220/30* (2013.01)
(58) Field of Classification Search
CPC ........... H01M 2220/30; H01M 50/543; H01M 50/20; H01M 2200/00; H01M 10/425; H01M 10/488; H01M 10/42; H01M 10/48; H02J 7/0029; H02J 7/0045; H02J 7/0047; H02J 7/0068; H02J 7/00304; H02J 7/0031; H02J 7/20; H02J 7/342; H02J 7/34; Y02E 60/10
See application file for complete search history.

(56) References Cited

U.S. PATENT DOCUMENTS

| | | | | |
|---|---|---|---|---|
| 2013/0340738 | A1* | 12/2013 | Mancini | F41B 5/1492 |
| | | | | 124/89 |
| 2014/0076192 | A1* | 3/2014 | Hurd | F16M 11/045 |
| | | | | 104/165 |
| 2016/0294207 | A1 | 10/2016 | Lau | |
| 2016/0346494 | A1* | 12/2016 | Harrison | H04L 65/4084 |
| 2016/0373651 | A1 | 12/2016 | Xu | |
| 2018/0037172 | A1* | 2/2018 | Nelson | B60R 11/04 |

* cited by examiner

MULTI-VOLTAGE OUTPUT CAMERA KIT HANDLE

CROSS-REFERENCE TO RELATED APPLICATIONS

This application claims priority to Chinese Patent Application No. 201921150125.7 with a filing date of Jul. 22, 2019. The content of the aforementioned applications, including any intervening amendments thereto, are incorporated herein by reference.

TECHNICAL FIELD

The utility model relates to a charging device, particularly relates to a multi-voltage output camera kit handle, and belongs to the technical field of mobile shooting devices.

BACKGROUND OF THE PRESENT INVENTION

In the photographing and video recording work, in addition to a photographing and video recording unit, auxiliary devices such as a monitor, a light supplement lamp, a microphone, an electric follow focus and an image transmission device are also required to complete the shooting. These devices are generally installed on a shooting kit. Therefore, each device needs to use different power modules, and the power supply voltages of different devices are different. At present, the power supply modes include: partly, the power is supplied from an additional output port on a camera battery, and partly, a power module needs to be additionally installed on the kit to supply power to accessories. Thus, the number of the accessories around the photographing and video recording unit is increased, causing space occupation and complicated operation.

Therefore, how to solve the centralized power supply of the photographing and video recording unit and the surrounding accessories and reduce the number of the accessories installed in the periphery is a current urgent problem to be solved. In addition, when a hand-held lamp is used in shooting, the current power supply mode is to hang a battery to the back of the lamp to supply power, which increases the weight of the lamp itself. After long-term use, a lamp interface is easy to be damaged and is not convenient to use.

SUMMARY OF PRESENT INVENTION

In order to overcome the above disadvantages in the prior art, the purpose of the utility model is to provide a multi-voltage output camera kit handle. The utility model solves the problems that the photographing and video recording unit and the surrounding accessories require a large variety of power supply, the power supply module occupies the space for installation and is complicated in operation, can replace an original handle on the kit, occupies no extra space, meets multi-voltage outputs and can supply power for the photographing and video recording unit and the surrounding accessories.

In order to solve the above technical problems, the utility model is realized by the following technical solutions:

A multi-voltage output camera kit handle comprises a shell, a lithium battery, an intelligent control circuit, a power interface and a power switch. The lithium battery, the intelligent control circuit, the power interface and the power switch are installed on the shell; the shell comprises a lithium battery accommodating cavity and a power interface window; the lithium battery is installed in the lithium battery accommodating cavity; and the power interface is installed at the power interface window; the power interface comprises a charging interface and a discharging interface; the charging interface is used for charging the lithium battery, and the discharging interface is used for discharging different devices; the power switch is used for starting or closing the discharging for different devices; and the power interface, the lithium battery and the power switch are welded on the intelligent control circuit.

As a further technical solution, the charging interface is a D-TAP, and the discharging interface is at least one of a D-TAP, a DC power socket, a USB, a Type-C, an aviation plug and a Remo connector.

As a further technical solution, the kit handle is also provided with an overshort protection indicator lamp; the overshort protection indicator lamp is installed on the shell and welded on the intelligent control circuit; the overshort protection indicator lamp is a two-color LED lamp for detecting the total power supply when all D-TAPs discharge the device; when the total power supply of all the D-TAPs is operated within limited current, the indicator lamp is green; and when the total power supply of all the D-TAPs is beyond the limited current, the indicator lamp is red, i.e., the current and voltage output is disconnected.

As a further technical solution, the kit handle is also provided with an LED power indicator lamp, and the LED power indicator lamp is installed on the shell and welded on the intelligent control circuit for displaying the remaining power of the lithium battery.

As a further technical solution, the intelligent control circuit comprises a protection circuit module, a main control module, a voltage and current detection module, a voltage adapter DC/DC1, a voltage adapter DC/DC2 and an output control module; the protection circuit module is respectively connected with the lithium battery, the voltage and current detection module, the voltage adapter DC/DC1 and the voltage adapter DC/DC2; the voltage adapter DC/DC1, the voltage adapter DC/DC2 and the output control module are respectively connected with different power interfaces; the voltage and current detection module outputs voltage information and current information to the main control module; the lithium battery outputs LDO power supply for providing power to the main control module; the power switch outputs switch information to the main control module; the main control module is processed to output the voltage and the current to the voltage adapter DC/DC1 and the voltage adapter DC/DC2, output direct current to the output control module, output the power information to the LED power indicator lamp and output the current information to the overshort protection indicator lamp.

The voltage adapter DC/DC1 and the voltage adapter DC/DC2 are used for splitting the voltage of the lithium battery into multiple voltage outputs.

As a further technical solution, the kit handle also comprises a kit connector, and the shape of the kit connector is customized according to different kits; and the shell is provided with at least one kit connector installing hole, and the shell is connected with the kit connector through the kit connector installing hole.

As a further technical solution, the kit connector is provided with a first installing hole and a second installing hole; the first installing hole is used for connecting the shell and the kit connector, and the second installing hole is used for connecting the kit connector and the kit.

As a further technical solution, the kit handle is also provided with a hot shoe slot, and the hot shoe slot is fixed to the shell.

As a further technical solution, the shell is made of alloy aluminum.

As a further technical solution, the kit connector 5 is made of alloy aluminum.

Beneficial Effects:

1. The utility model has simple structure, and can realize power supply needs of different voltages of different devices. The shape can be used as a handle, which is more convenient for use in the photographing and video recording work. The existing kit hole sites are used for connection, and the kit connector is used for connecting the kit and the kit handle, so as to replace the handle of the kit without adding additional connection accessories.

2. In the utility model, the lithium battery is split into multiple voltage outputs through the voltage adapters as needed, and different discharging interfaces are arranged to supply power to different devices, thereby reducing the number of different types of power batteries carried in outside shooting.

3. The utility model adopts a large-capacity lithium battery having long service life, high energy, high power endurance, strong adaptability to high and low temperature, and low self-discharge rate.

4. The intelligent control circuit in the utility model can realize the over-discharge protection of the lithium battery, high-precision voltage and current detection, and constant monitoring of the residual power of the lithium battery, has the function of overshort protection for the D-TAP, and realizes integrated management.

5. A plurality of kit connector installing holes are reserved on the shell of the utility model for the installation of different types of kit connectors, and can simultaneously satisfy the charging of devices of a plurality of kits.

6. The D-TAP of the utility model not only can charge the lithium battery, but also can discharge the device, and the power interface can be replaced as needed to satisfy the charging of different devices.

7. The hot shoe slot in the utility model can achieve that an external device is not directly connected through the kit, for example, the hand-held lamp can be directly connected with the hot shoe slot for power supply.

8. The shell and the kit connector in the utility model are made of the alloy aluminum, so that the kit handle is light.

LIST OF REFERENCE NUMERALS shell 1; lithium battery 2; intelligent control circuit 3; power interface 4; kit connector 5; kit 6;

lithium battery accommodating cavity 1-1; power interface window 1-2; kit connector installing hole 1-3; LED power indicator lamp 1-4; hot shoe slot 1-5; overshort protection indicator lamp 1-6; power switch 1-7;

first installing hole 5-1; and second installing hole 5-2.

DETAILED DESCRIPTION OF PREFERRED EMBODIMENTS

The utility model is further described below in detail in combination with the drawings and specific embodiments. The technical means adopted in the specific structure not illustrated in the embodiments are generally the conventional means known by those skilled in the art.

Embodiment 1

Further detailed description is made in combination with FIGS. 1-4 and FIG. 9. The shape of the shell is customized according to customer needs.

Figure 1:
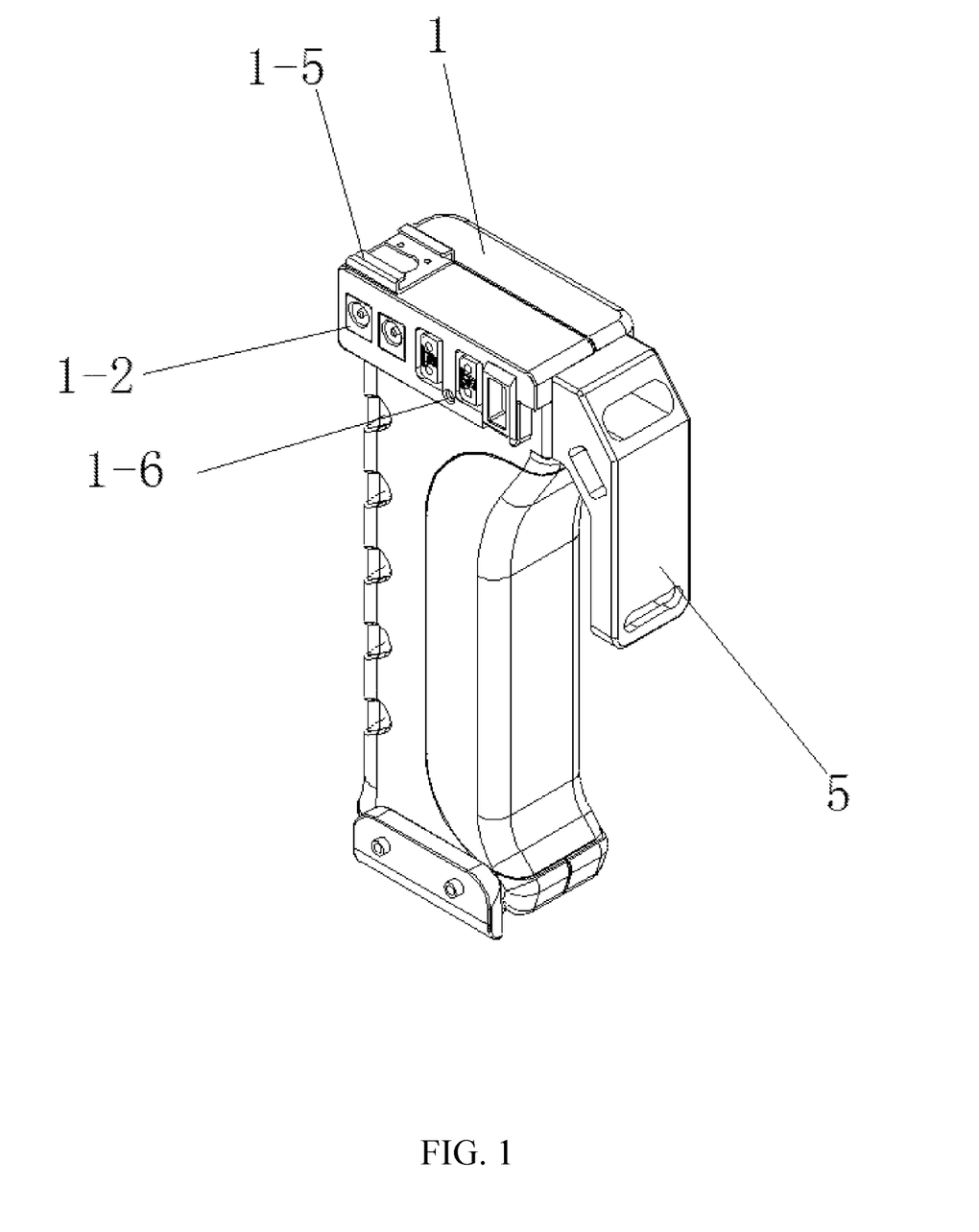
FIG. 1 is an overall structural diagram of a multi-voltage output camera kit handle in an embodiment 1.
Figure 2:
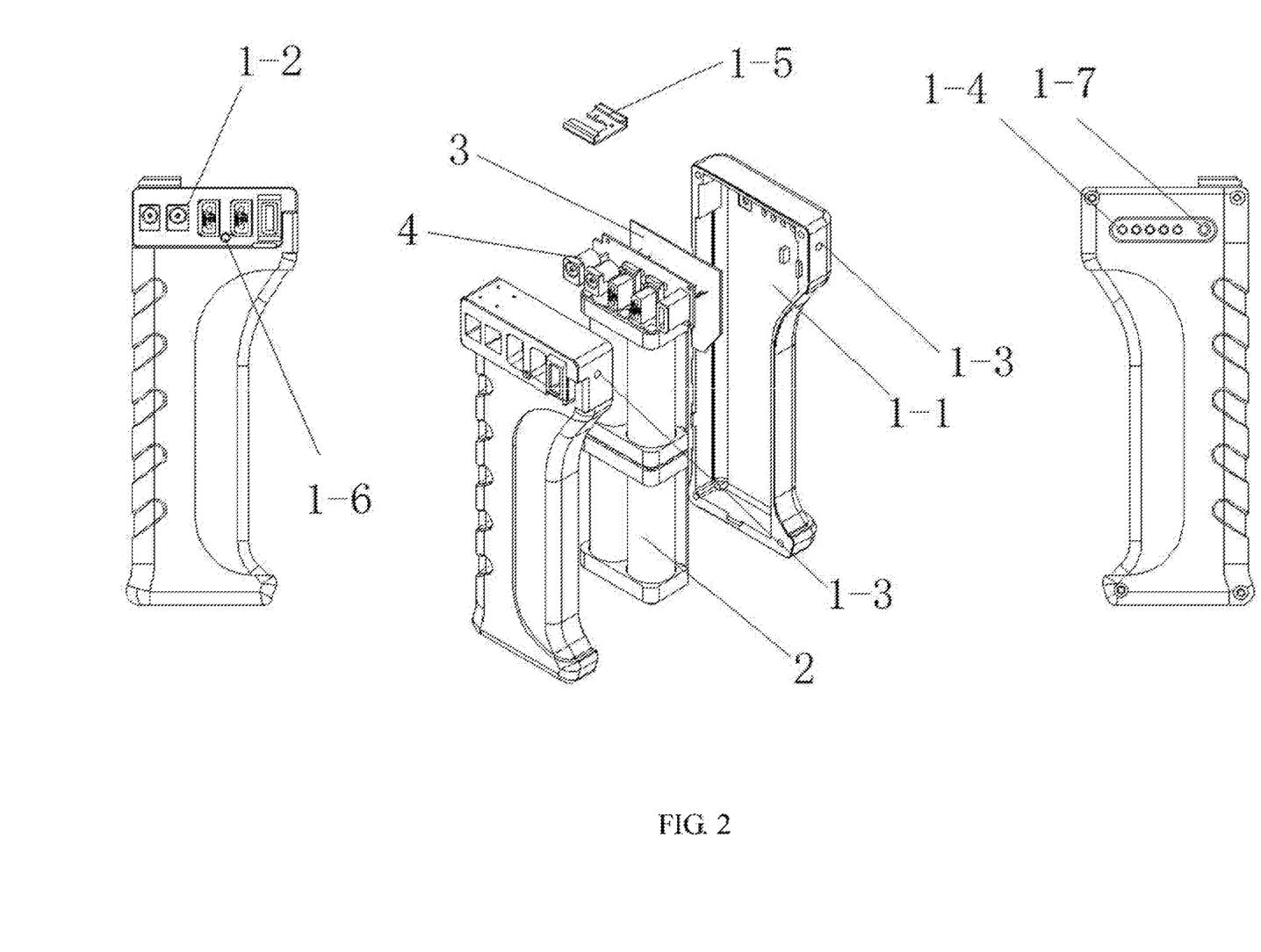
FIG. 2 shows a left view, a right view and a sectional structural diagram of a multi-voltage output camera kit handle in an embodiment 1.

A multi-voltage output camera kit handle comprises a shell 1, a lithium battery 2, an intelligent control circuit 3, a power interface 4 and a power switch 1-7. The lithium battery 2, the intelligent control circuit 3, the power interface 4 and the power switch 1-7 are installed on the shell 1; the shell 1 comprises a lithium battery accommodating cavity 1-1 and a power interface window 1-2; the lithium battery 2 is installed in the lithium battery accommodating cavity 1-1; and the power interface 4 is installed at the power interface window 1-2; the power interface 4 comprises a charging interface and a discharging interface; the charging interface is used for charging the lithium battery 2, and the discharging interface is used for discharging different devices; the power switch 1-7 is used for starting or closing the discharging for different devices; and the power interface 4, the lithium battery 2 and the power switch 1-7 are welded on the intelligent control circuit 3.

The charging interface is a D-TAP, and the discharging interface is at least one of a D-TAP, a DC power socket, a USB, a Type-C, an aviation plug and a Remo connector.

The kit handle is also provided with an overshort protection indicator lamp 1-6; the overshort protection indicator lamp 1-6 is installed on the shell 1 and welded on the intelligent control circuit 3; the overshort protection indicator lamp 1-6 is a two-color LED lamp for detecting the total power supply when all D-TAPs discharge the device; when the total power supply of all the D-TAPs is operated within limited current of 10 A, the indicator lamp is green; and when the total power supply of all the D-TAPs is beyond the limited current of 10 A, the indicator lamp is red, i.e., the current and voltage output is disconnected.

The kit handle is also provided with an LED power indicator lamp 1-4, and the LED power indicator lamp 1-4 is installed on the shell 1 and welded on the intelligent control circuit 3 for displaying the remaining power of the lithium battery 2.

Figure 3:
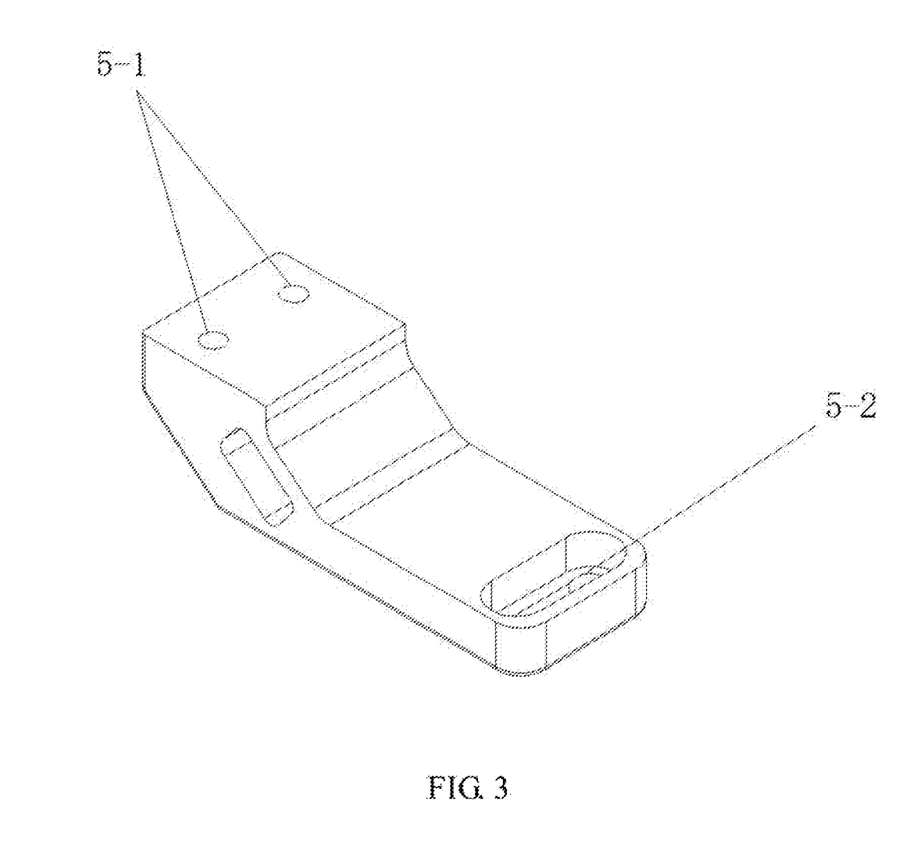
FIG. 3 is a structural diagram of a kit connector of a multi-voltage output camera kit handle in an embodiment 1.
Figure 4:
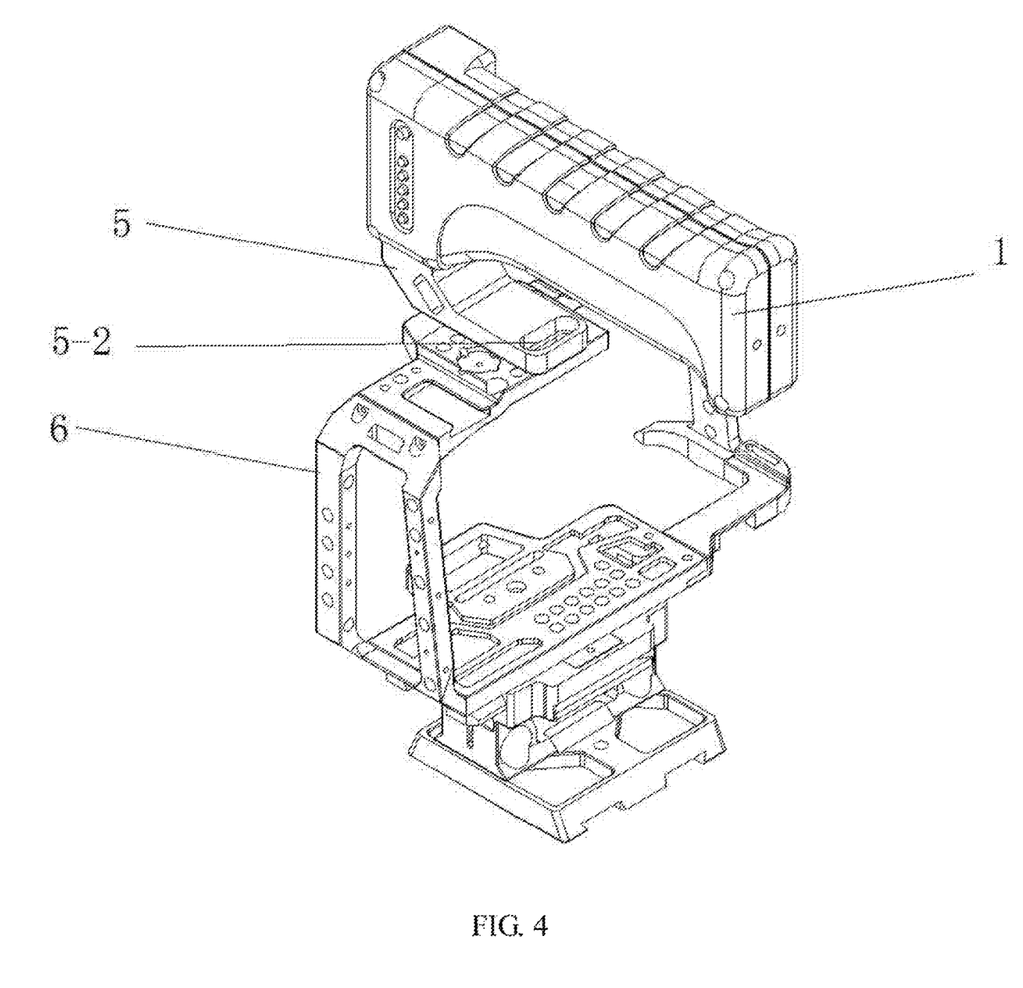
FIG. 4 is a use state diagram of a multi-voltage output camera kit handle and a kit in an embodiment 1.
Figure 9:
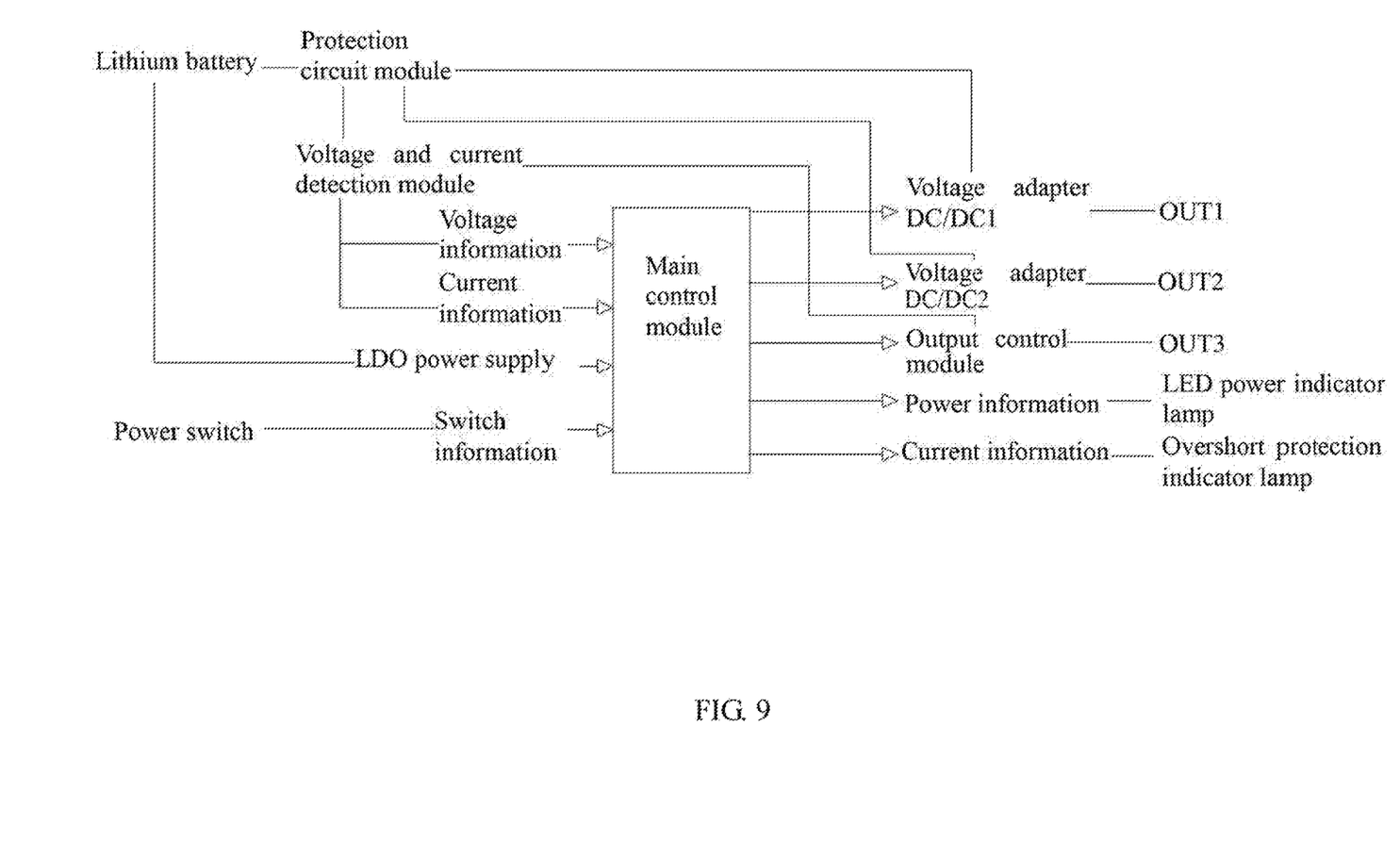
FIG. 9 is a schematic frame diagram of an intelligent control circuit in a multi-voltage output camera kit handle.

The intelligent control circuit 3 comprises a protection circuit module, a main control module, a voltage and current detection module, a voltage adapter DC/DC1, a voltage adapter DC/DC2 and an output control module; the protection circuit module is respectively connected with the lithium battery 2, the voltage and current detection module, the voltage adapter DC/DC1 and the voltage adapter DC/DC2; the voltage adapter DC/DC1, the voltage adapter DC/DC2 and the output control module are respectively connected with different power interfaces 4; the voltage and current detection module outputs voltage information and current information to the main control module; the lithium battery 2 outputs LDO power supply for providing power to the main control module; the power switch 1-7 outputs switch information to the main control module; the main control module is processed to output the voltage and the current to the voltage adapter DC/DC1 and the voltage adapter DC/DC2, output direct current to the output control module, output the power information to the LED power indicator lamp 1-4 and output the current information to the overshort protection indicator lamp 1-6. The voltage adapter DC/DC1 and the voltage adapter DC/DC2 are used for splitting the voltage of the lithium battery 2 into multiple voltage outputs.

e kit handle also comprises a kit connector 5, and the shape of the kit connector 5 is customized according to different kits 6; and the shell 1 is provided with at least one kit connector installing hole 1-3, and the shell 1 is connected with the kit connector 5 through the kit connector installing hole 1-3.

The kit connector 5 is provided with a first installing hole 5-1 and a second installing hole 5-2; the first installing hole 5-1 is used for connecting the shell 1 and the kit connector 5; and the second installing hole 5-2 is used for connecting the kit connector 5 and the kit 6.

The kit handle is also provided with a hot shoe slot 1-5, and the hot shoe slot 1-5 is fixed to the shell 1.

The shell 1 is made of alloy aluminum.

The kit connector 5 is made of alloy aluminum.

Embodiment 2

Further detailed description is made in combination with FIGS. 5-8 and FIG. 9. The shape of the shell is customized according to customer needs.

Figure 5:
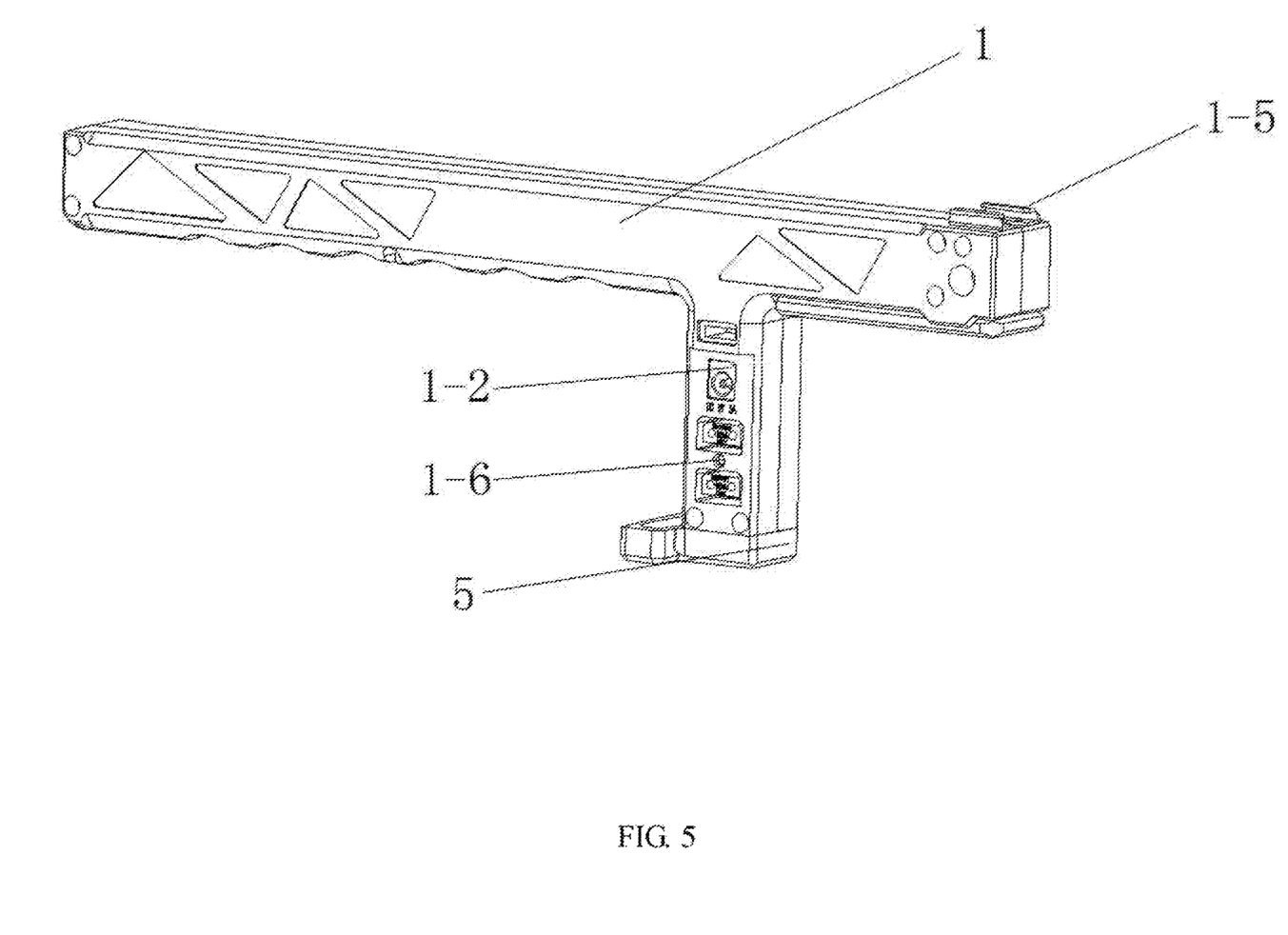
FIG. 5 is an overall structural diagram of a multi-voltage output camera kit handle in an embodiment 2.
Figure 6:
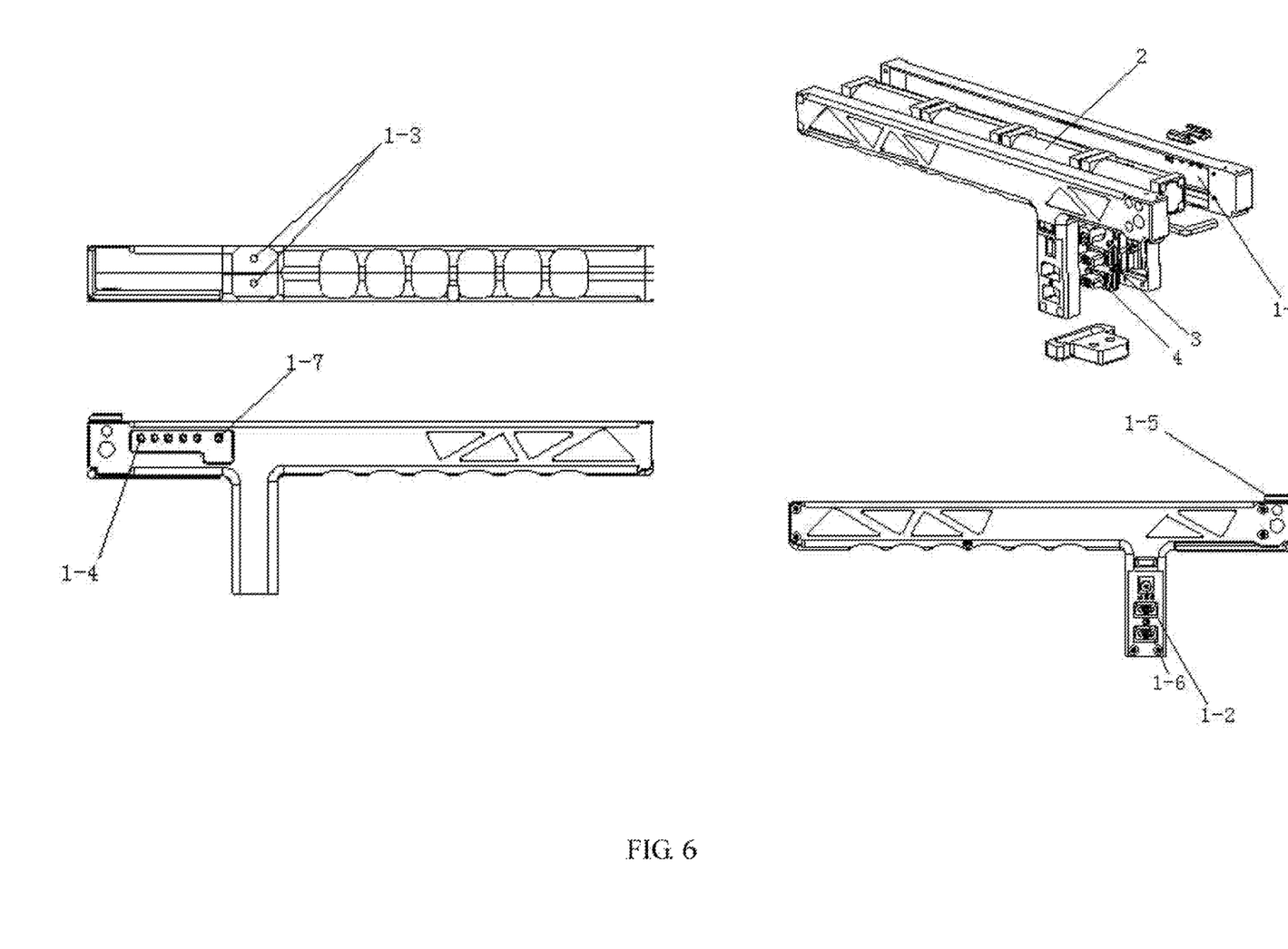
FIG. 6 shows a bottom view, left view, a right view and a sectional structural diagram of a multi-voltage output camera kit handle in an embodiment 2.

A multi-voltage output camera kit handle comprises a shell 1, a lithium battery 2, an intelligent control circuit 3, a power interface 4 and a power switch 1-7. The lithium battery 2, the intelligent control circuit 3, the power interface 4 and the power switch 1-7 are installed on the shell 1; the shell 1 comprises a lithium battery accommodating cavity 1-1 and a power interface window 1-2; the lithium battery 2 is installed in the lithium battery accommodating cavity 1-1; and the power interface 4 is installed at the power interface window 1-2; the power interface 4 comprises a charging interface and a discharging interface; the charging interface is used for charging the lithium battery 2, and the discharging interface is used for discharging different devices; the power switch 1-7 is used for starting or closing the discharging for different devices; and the power interface 4, the lithium battery 2 and the power switch 1-7 are welded on the intelligent control circuit 3.

The charging interface is a D-TAP, and the discharging interface is at least one of a D-TAP, a DC power socket, a USB, a Type-C, an aviation plug and a Remo connector.

The kit handle is also provided with an overshort protection indicator lamp 1-6; the overshort protection indicator lamp 1-6 is installed on the shell 1 and welded on the intelligent control circuit 3; the overshort protection indicator lamp 1-6 is a two-color LED lamp for detecting the total power supply when all D-TAPs discharge the device; when the total power supply of all the D-TAPs is operated within limited current of 10 A, the indicator lamp is green; and when the total power supply of all the D-TAPs is beyond the limited current of 10 A, the indicator lamp is red, i.e., the current and voltage output is disconnected.

The kit handle is also provided with an LED power indicator lamp 1-4, and the LED power indicator lamp 1-4 is installed on the shell 1 and welded on the intelligent control circuit 3 for displaying the remaining power of the lithium battery 2.

The intelligent control circuit 3 comprises a protection circuit module, a main control module, a voltage and current detection module, a voltage adapter DC/DC1, a voltage adapter DC/DC2 and an output control module; the protection circuit module is respectively connected with the lithium battery 2, the voltage and current detection module, the voltage adapter DC/DC1 and the voltage adapter DC/DC2; the voltage adapter DC/DC1, the voltage adapter DC/DC2 and the output control module are respectively connected with different power interfaces 4; the voltage and current detection module outputs voltage information and current information to the main control module; the lithium battery 2 outputs LDO power supply for providing power to the main control module; the power switch 1-7 outputs switch information to the main control module; the main control module is processed to output the voltage and the current to the voltage adapter DC/DC1 and the voltage adapter DC/DC2, output direct current to the output control module, output the power information to the LED power indicator lamp 1-4 and output the current information to the overshort protection indicator lamp 1-6. The voltage adapter DC/DC1 and the voltage adapter DC/DC2 are used for splitting the voltage of the lithium battery 2 into multiple voltage outputs.

Figure 7:
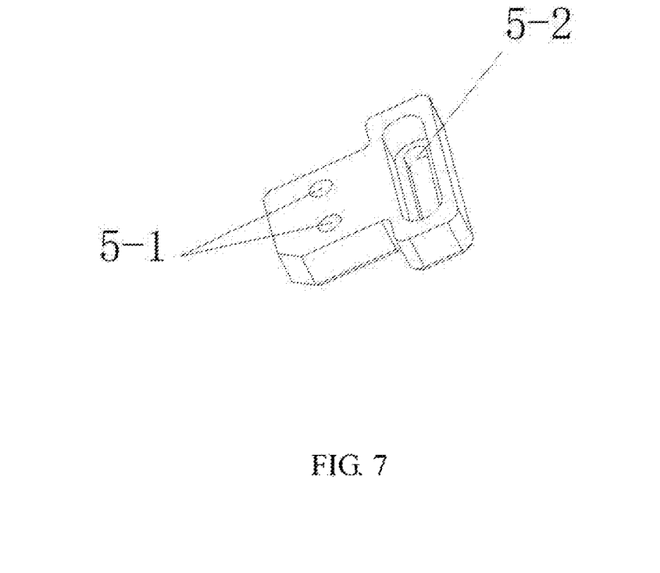
FIG. 7 is a structural diagram of a kit connector of a multi-voltage output camera kit handle in an embodiment 2.
Figure 8:
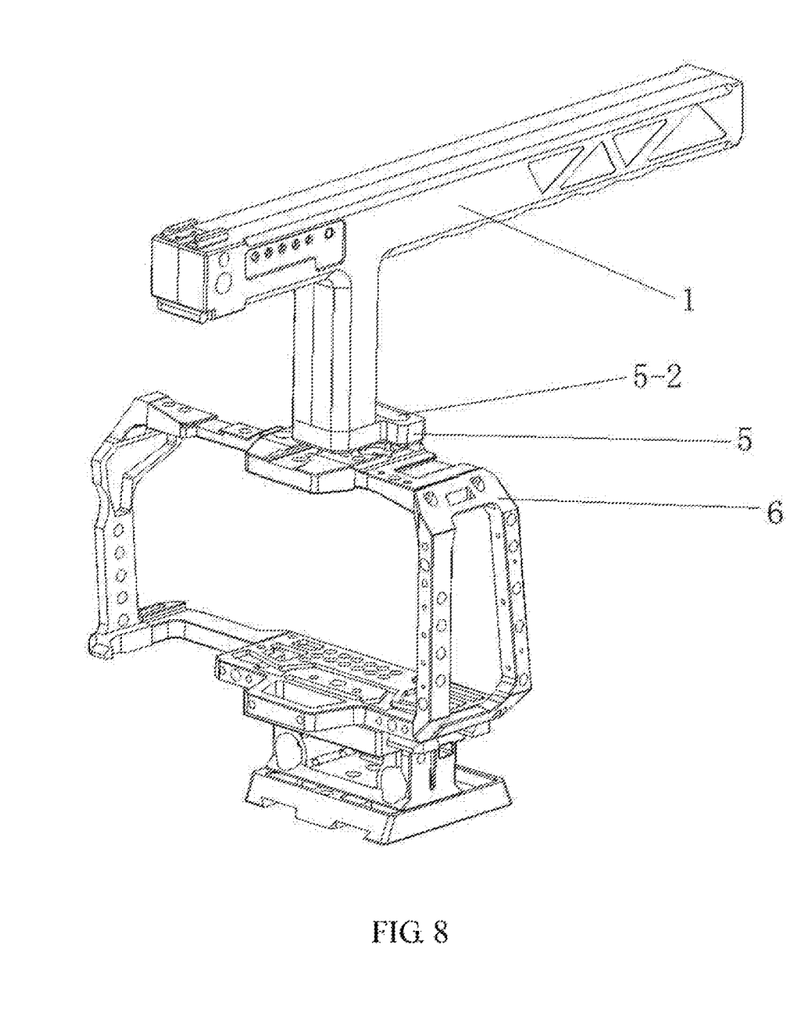
FIG. 8 is a use state diagram of a multi-voltage output camera kit handle and a kit in an embodiment 2.

The kit handle also comprises a kit connector 5, and the shape of the kit connector 5 is customized according to different kits 6; and the shell 1 is provided with at least one kit connector installing hole 1-3, and the shell 1 is connected with the kit connector 5 through the kit connector installing hole 1-3.

The kit connector 5 is provided with a first installing hole 5-1 and a second installing hole 5-2; the first installing hole 5-1 is used for connecting the shell 1 and the kit connector 5; and the second installing hole 5-2 is used for connecting the kit connector 5 and the kit 6.

The kit handle is also provided with a hot shoe slot 1-5, and the hot shoe slot 1-5 is fixed to the shell 1.

The shell 1 is made of alloy aluminum.

The kit connector 5 is made of alloy aluminum.

What is claimed is:

1. A multi-voltage output camera kit handle, comprising a shell, a lithium battery, an intelligent control circuit, a power interface and a power switch, wherein the lithium battery, the intelligent control circuit, the power interface and the power switch are installed on the shell;

the shell comprises a lithium battery accommodating cavity and a power interface window; the lithium battery is installed in the lithium battery accommodating cavity; and the power interface is installed at the power interface window;

the power interface comprises a charging interface and a discharging interface; the charging interface is used for charging the lithium battery, and the discharging interface is used for discharging different devices;

the power switch is used for starting or closing the discharging for different devices;

the power interface, the lithium battery and the power switch are welded on the intelligent control circuit;

wherein the intelligent control circuit comprises a protection circuit module, a main control module, a voltage and current detection module, a voltage adapter DC/DC1, a voltage adapter DC/DC2, and an output control module;

the protection circuit module is connected with the lithium battery, the voltage and current detection module, the voltage adapter DC/DC1, and the voltage adapter DC/DC2;

the voltage adapter DC/DC1, the voltage adapter DC/DC2, and the output control module are each connected with different power interfaces;

the voltage and current detection module outputs voltage information and current information to the main control module;

the lithium battery outputs LDO power supply for providing power to the main control module;

the power switch outputs switch information to the main control module;

the main control module outputs the voltage and the current to the voltage adapter DC/DC1 and the voltage adapter DC/DC2, outputs direct current to the output control module, outputs the power information to the LED power indicator lamp, and outputs the current information to the overshort protection indicator lamp; and the voltage adapter DC/DC1 and the voltage adapter DC/DC2 are used for splitting the voltage of the lithium battery into multiple voltage outputs.

2. The multi-voltage output camera kit handle according to claim 1, wherein the charging interface is a D-TAP, and the discharging interface is at least one of a D-TAP, a DC power socket, a USB, a Type-C, an aviation plug and a Remo connector.

3. The multi-voltage output camera kit handle according to claim 2, wherein the kit handle is also provided with an overshort protection indicator lamp; the overshort protection indicator lamp is installed on the shell and welded on the intelligent control circuit; the overshort protection indicator lamp is a two-color LED lamp for detecting the total power supply when all D-TAPs discharge the device; when the total power supply of all the D-TAPs is operated within limited current, the indicator lamp is green; and when the total power supply of all the D-TAPs is beyond the limited current, the indicator lamp is red, i.e., the current and voltage output is disconnected.

4. The multi-voltage output camera kit handle according to claim 1, wherein the kit handle is also provided with an LED power indicator lamp, and the LED power indicator lamp is installed on the shell and welded on the intelligent control circuit for displaying the remaining power of the lithium battery.

5. The multi-voltage output camera kit handle according to claim 1, wherein the kit handle also comprises a kit connector, and the shape of the kit connector is customized according to different kits; and the shell is provided with at least one kit connector installing hole, and the shell is connected with the kit connector through the kit connector installing hole.

6. The multi-voltage output camera kit handle according to claim 5, wherein the kit connector is provided with a first installing hole and a second installing hole; the first installing hole is used for connecting the shell and the kit connector; and the second installing hole is used for connecting the kit connector and the kit.

7. The multi-voltage output camera kit handle according to claim 6, wherein the kit connector is made of alloy aluminum.

8. The multi-voltage output camera kit handle according to claim 5, wherein the kit connector is made of alloy aluminum.

9. The multi-voltage output camera kit handle according to claim 1, wherein the kit handle is also provided with a hot shoe slot, and the hot shoe slot is fixed to the shell.

10. The multi-voltage output camera kit handle according to claim 1, wherein the shell is made of alloy aluminum.

* * * * *